March 8, 1932.  H. C. SIMMONS  1,848,229
COMBINATION DOUGH FERMENTATION COMPARTMENT AND MAKE-UP TABLE
Filed Jan. 30, 1931   2 Sheets-Sheet 1
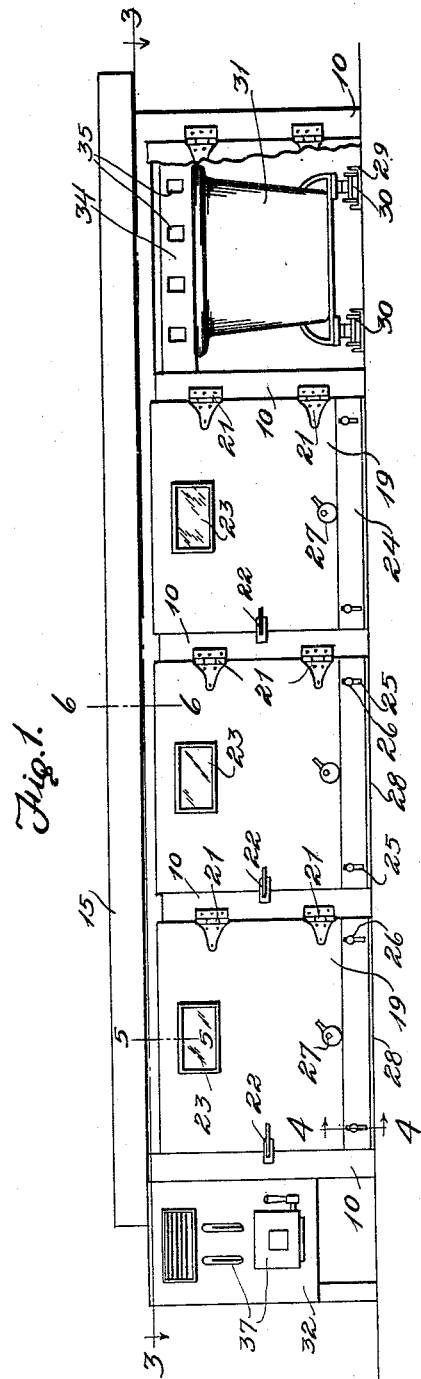
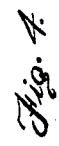
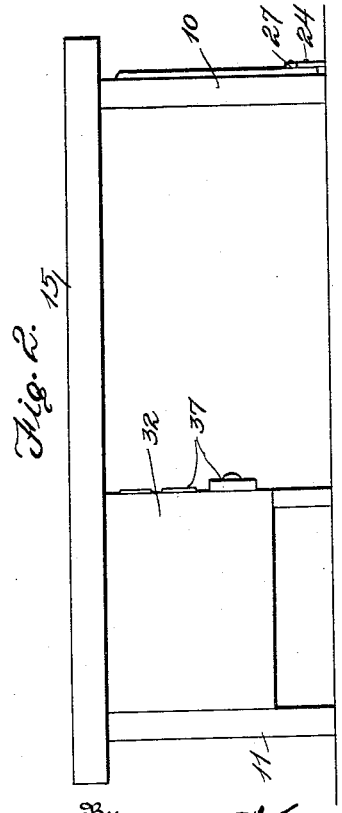
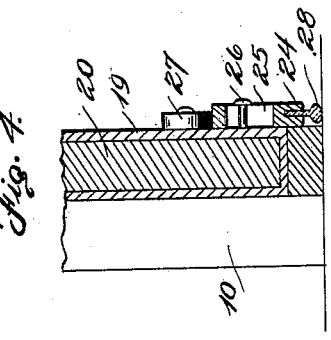
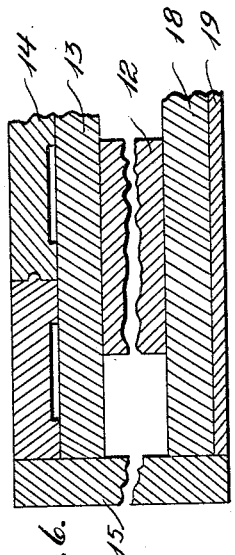
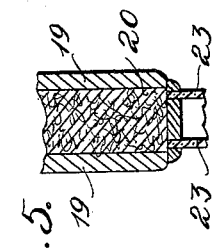
Inventor
H. C. Simmons.
By 
Attorney March 8, 1932. H. C. SIMMONS 1,848,229
COMBINATION DOUGH FERMENTATION COMPARTMENT AND MAKE-UP TABLE
Filed Jan. 30, 1931 2 Sheets-Sheet 2
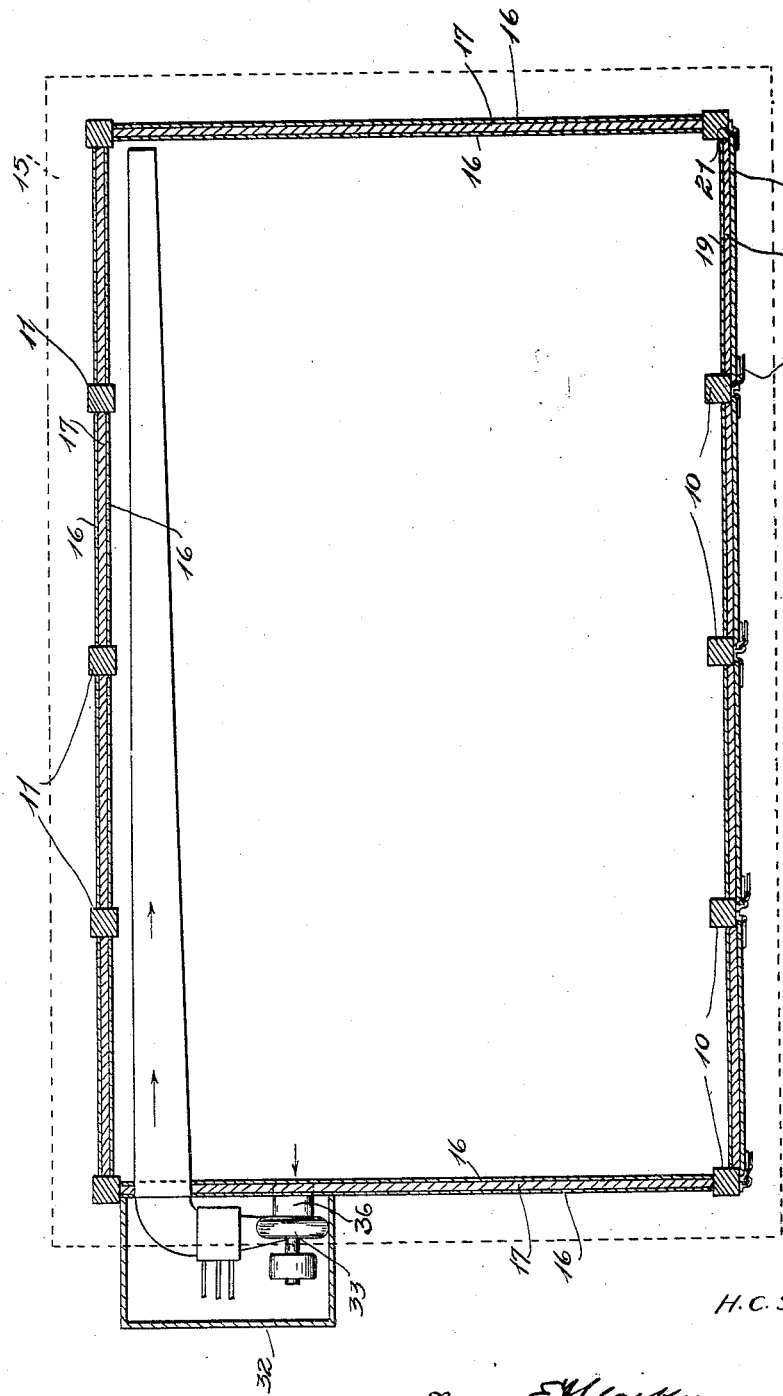

Patented Mar. 8, 1932

1,848,229

UNITED STATES PATENT OFFICE

HARL C. SIMMONS, OF CHICAGO, ILLINOIS

COMBINATION DOUGH FERMENTATION COMPARTMENT AND MAKE UP TABLE

Application filed January 30, 1931. Serial No. 512,432.

This invention relates to bakery apparatus and has special reference to a combination make-up table and dough fermentation compartment.

One important object of the invention is to provide an improved general construction of devices of this character.

A second important object of the invention is to provide a make-up table having a dough raising compartment beneath it, the compartment being arranged to receive a series of rolling tubs or vats so arranged that they may be positioned in the compartment for raising the dough or be drawn out beneath the front of the table to permit the transfer of dough between the tubs or vats and the table top.

A third important object of the invention is to provide an improved device of this character especially adapted for use in small bakeries to economize room.

A fourth important object of the invention is to provide a novel device of this character wherein the heat and moisture in the fermentation compartment will not affect the table top or the dough thereon.

A fifth important object of the invention is to provide improved ventilation means for such a device.

A sixth important object of the invention is to provide an improved seal for the doors of the fermentation compartment so that air is prevented from escaping between the floor of the bakery and these doors.

With the above and other objects in view as will be hereinafter apparent, the invention consists in general of certain novel details of construction and combinations of parts hereinafter fully described, illustrated in the accompanying drawings and specifically claimed.

In the drawings like characters of reference indicate like parts in the several views, and:

Figure 1 is a front elevation of the invention.

Figure 2 is an elevation showing the left hand end of Figure 1.

Figure 3 is a section on the line 3—3 of Figure 1.

Figure 4 is an enlarged detail section on the line 4—4 of Figure 1.

Figure 5 is an enlarged detail section on the line 5—5 of Figure 1.

Figure 6 is an enlarged detail section on the line 6—6 of Figure 1.

In the constructional embodiment here shown the device has been illustrated as having four stalls or sections each adapted to receive a dough tub or vat and having its individual door. However, the invention is not limited to any particular number of such sections, the number of sections used depending on the requirements of the particular bakery in which the device is installed. It will be obvious, moreover, from what follows, that the invention is not limited to a table on which the work is carried on from one side only but may be embodied in a table designed to have the work carried on from both sides, doors being provided on each side. It is not deemed necessary to illustrate the various embodiments because the invention will be fully understood from the single embodiment here shown and described.

In this form there is provided a series of spaced front legs 10 and a series of similarly spaced rear legs 11 arranged directly behind the front legs. On these legs is supported a pair of hardwood stringers 12 extending longitudinally of the table and on these stringers rests a harwood sub-top 13 whereon is fixed the hardwood top 14 preferably made of matched maple flooring or other suitable material. The table top thus formed projects beyond the line of the legs. An edging board 15 finishes this top. The ends, and as here shown the rear, of the invention are walled in between the posts or legs, each wall consisting of a pair of spaced sheets 16 of moisture and heat proof insulating material and having the space between the sheets filled with compressed cork 17 or other like insulating material. Under the stringers is secured a compartment ceiling consisting of an upper layer of compressed cork 18 or other insulating material beneath which is a thin layer 19 of the same material as the wall sheets.

The door openings extend from leg to leg of the front of the device and each is closed by a door having a body formed of spaced sheets 19 and a cork packing 20 like the walls. Hinges 21 support each door at one side and a latch 22 of ordinary type controls the opening of the door and is located at the opposite edge. At the upper part of each door is a window formed of spaced sheets 23 of glass. The bottom edge of each door is spaced above the floor on which the legs rest and mounted on the front face of each door at the bottom thereof is a plate 24 having vertical slots 25 formed therein. Through these slots pass the screws 26, this arrangement permitting the closure plate 24 to rise and fall. A handled cam 27 is pivotally mounted, on the door above the center of the plate, and along the lower edge of the door is secured a rubber packing strip 28. By this means rotation of the cam in one direction forces the plate 24 down and brings the rubber into compressed condition against the floor so as to form a tight seal and compensate for irregularities in the flooring.

Behind each door are guide rails 29 for the wheels or casters 30 of the dough vat or tub 31 which may thus be rolled in and out of the compartment and it will be seen that the vat, when drawn out, is in position for ready transfer of dough between the vat and table top.

At one end of the back part of the table is a housing 32 wherein is mounted a heating, ventilating and humidifying apparatus 33 from which extends a conduit 34 which runs along the upper rear part of the dough compartment from one end to the other thereof and is tapered to provide for uniform distribution of heated and moistened air through suitable vents 35. A return pipe 36 leads back to the ventilating apparatus and instruments 37 are provided on the front of the housing 32 to measure and regulate the volume, temperature and humidity of the air supply. No claim is made in the present application to the specific details of this mechanism so that these parts have been shown only in diagram.

In use the dough is placed in the tubs or vats, the doors closed and the dough compartment supplied with hot moist air. The dough is left in the dough compartment until raised whereupon it is drawn out just in front of the table and lifted thereon for making up in loaves and the like.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A device of the kind described, including a dough raising compartment having a top constituting a make-up table, a heat and moisture insulating ceiling in the compartment close under the top to prevent heating and dampening of said top, said compartment being provided with access doors along at least one side thereof, dough vats movable into and out of the compartment through said doors when open and being positionable beneath the front edge of the table whereby dough may be readily transferred between said vats and table, and ventilating apparatus arranged to supply heated and moistened air to the upper rear part of the compartment remote from said doors.

2. A combined baker's dough raising compartment and work table including end walls, a rear wall and a front wall, a top resting on said walls, said walls being of such height as to permit convenient access to the top by a workman for working dough thereon, said compartment being open at the bottom whereby the walls rest directly on the floor of the room wherein the compartment is located, said front wall having a series of spaced door openings formed therein extending to the bottom of the wall whereby dough raising vats may be rolled unobstructedly into and out of the compartment, doors for closing said door openings, and a housing fixed to one of the end walls of the compartment and provided with means to supply hot moist air to said compartment, said walls and doors being insulated to retain the heat and moisture in the compartment and the top being insulated to prevent the working surface from rising above room temperature and having a moisture proof lining to prevent moisture in the compartment from affecting the top.

3. A combined baker's dough raising compartment and work table including end walls, a rear wall and a front wall, a top resting on said walls, said walls being of such height as to permit convenient access to the top by a workman for working dough thereon, said compartment being open at the bottom whereby the walls rest directly on the flooor of the room wherein the compartment is located, said front wall having a series of spaced door openings formed therein extending to the bottom of the wall whereby dough raising vats may be rolled unobstructedly into and out of the compartment, doors for closing said door openings, sealing means mounted on the lower edge of the doors for movement into and out of engagement with the floor of the room, means to move the sealing means into and out of said engagement, and a housing fixed to one of the end walls of the compartment and provided with means to supply hot moist air to said compartment, said walls and doors being insulated to retain the heat and moisture in the compartment and the top being insulated to prevent the working surface from rising above room temperature and having a moisture proof lining to prevent moisture in the compartment from affecting the top.

In testimony whereof I affix my signature.

HARL C. SIMMONS.